United States Patent [19]
Cave

[11] Patent Number: 5,841,438
[45] Date of Patent: Nov. 24, 1998

[54] VISUAL AID FOR BANDWIDTH ALLOCATION IN MULTIMEDIA SCRIPTING TOOLS

[75] Inventor: Ellis K. Cave, Garland, Tex.

[73] Assignee: InterVoice Limited Partnership, Reno, Nev.

[21] Appl. No.: 949,062

[22] Filed: Oct. 10, 1997

[51] Int. Cl.⁶ ........................................ G06F 15/00
[52] U.S. Cl. ...................... 345/348; 345/302; 345/326; 345/328
[58] Field of Search ................... 345/326, 328, 345/348, 349, 340, 302; 395/701

[56] References Cited

U.S. PATENT DOCUMENTS

5,680,619 10/1997 Bro .......................................... 395/701

Primary Examiner—Ba Huynh
Attorney, Agent, or Firm—Fulbright & Jaworski L.L.P.

[57] ABSTRACT

A visual tool for scheduling the delivery of media objects within varying constraints of available bandwidth. In a preferred embodiment in which the invention is enabled by software executable on a general purpose multimedia grade computer, a system designer orchestrates the playback of a series of media objects represented as playback icons on a playback "score" analogous to a musical score. The present invention further creates and displays a corresponding download score, on which download icons (corresponding to playback icons on the playback score) are initially deployed as rectangles and arranged according to default rules. The topographical area of the download icons, as displayed, corresponds to the data size of the media objects. The designer then ordains a bandwidth constraint ("pipe") causing the download icons to be compressed into the pipe, likely overlapping. The designer may now arrange the download icons within the pipe by adapting the shape of the download icons into square-cornered polygons that no longer overlap within the pipe. The system meanwhile keeps the topographical area of the download icons constant, regardless of the shape into which the designer adapts them. Eventually, as the playback score becomes more information-rich, the designer will no longer be able to adapt the shape of download icons within the pipe without causing delivery to fall behind demand for playback. The invention highlights this condition to the designer, who must then take corrective action.

53 Claims, 6 Drawing Sheets

VISUAL AID FOR BANDWIDTH ALLOCATION IN MULTIMEDIA SCRIPTING TOOLS

RELATED APPLICATION

This application is related to commonly-assigned and co-pending U.S. patent application USER DEVICE-INDEPENDENT TRANSACTION MODEL, filed Dec. 5, 1996, Ser. No. 08/761004, the disclosure of which application is incorporated herein by reference.

TECHNICAL FIELD OF THE INVENTION

This invention relates generally to the delivery of electronic multimedia information, and more specifically to a graphical tool that assists a system designer in scripting the playback of media objects according to constraints of bandwidth.

BACKGROUND OF THE INVENTION

The above-referenced, commonly assigned and co-pending U.S. application entitled USER DEVICE-INDEPENDENT TRANSACTION MODEL (the "Previous Invention") discloses a model for delivering generic information from a central system to connected users whose terminal devices communicate in varying formats and/or media. The Previous Invention teaches the use of Transaction Templates ("TTs") and User Device Templates ("UDTs") which script and condition device-independent information exchanges between the system and users to be compatible with the different format and media requirements of said users' various terminal devices. In the Previous Invention, TTs enable an exchange of information between the system and the user in the information's most basic, generic format. UDTs associated with each TT then condition the information exchanged in the TT to be format- and media-compatible with the device through which the user is communicating with the system. The same information exchange may thus be enabled in a variety of environments according to the formats and media supported by various users' terminal devices.

A constraint placed upon the effectiveness of UDTs, however, is the available bandwidth in which to deliver information in the scripted formats and/or media. This is particularly applicable when the information is to be delivered in several media, the display of which to the user is to appear simultaneous and/or synchronized. It will be appreciated that, according to the Previous Invention, a UDT may be designed wherein an information transaction is scripted to appear to the user as a sophisticated multimedia experience, including sound, video, graphics and text, assuming that all of these media are supported by the user's multimedia PC. If the available bandwidth in the interconnecting link between system and user is insufficient to deliver all this information according to the time constraints of the script, however, this multimedia UDT will operate at reduced effectiveness.

One solution to this problem of insufficient bandwidth is for the user simply to sit and wait for a sufficient amount of information to have been delivered to begin the script with confidence that it can be completed without running out of information mid-script.

Another solution is to redesign either (or both) the sequence or the content of the script, so that the script's delivery is either slower or less data-rich. For example, a display of merely ornamental graphics could be delayed or removed to make room for the earlier delivery of more strategic information. Alternatively, a media object may be degraded (e.g. sampling rate reduced) to make the object less data-rich.

A yet further solution is to pre-load information in advance of its being needed by the script. This solution may be enabled using excess bandwidth in early parts of a particular script. This may be done on an individual script basis, alternatively, when the system knows specifically that a later script will be played, information for that later script may be pre-loaded on the user's terminal device using excess bandwidth during an earlier script.

Whichever solution is chosen, however, it would be highly advantageous to have a computer tool that enables delivery of information to be scheduled so as to optimize available bandwidth, while still enabling the playing of a multimedia script with minimal startup delay and no interruptions. Using this tool, the system designer would be able to orchestrate scripts linked to an optimum delivery schedule of the underlying media objects. When insufficient bandwidth is available for an instantaneous playback, the designer would further be able to make choices among the alternatives described above, such as delaying startup, redesigning script sequence and/or content, or pre-loading information, so as to make full and best use of available bandwidth. Further, in the context of UDTs according to the Previous Invention, the designer would be able to design an array of UDTs in which a particular information exchange could be scripted to be delivered at various levels of multimedia sophistication according to predetermined increments of available bandwidth.

Methods of identifying and quantifying available bandwidth in interconnecting links are known in the art. It will therefore be seen that given an array of UDTs as described above, each designed to deliver media objects on a schedule that fits within the constraints of an incrementally different bandwidth, it would then become possible, under the Previous Invention, to select a UDT to match the available bandwidth recognized in a particular interconnecting link.

Orchestrating the delivery of media objects within available bandwidth would further be advantageously enabled in a graphical environment on a general purpose multimedia-grade desktop computer. For example, scripting tools are known in the art where a designer may orchestrate the playback of a series of media objects by creating, adapting and executing a horizontal bar chart, much like a "musical score." There is a need in the art to attach this known orchestration and playback capability to corresponding functionality that shows how playback choices are affected by the constraints of delivery bandwidth. In this way, a designer may design, see, hear and manipulate scripts that also take delivery variables such as available bandwidth into account.

SUMMARY OF THE INVENTION

For the purposes of this disclosure, "media object" or "object" is defined as an information structure, such as a file, which, when executed on a computer, plays the information to a user. A media object may be, for example, a sound clip, or a video clip, or text, or a graphic. Media objects may come in any size or format suitable to be intelligible to a user through a variety of terminal devices.

In distinction to the foregoing definition of a media object, this disclosure also defines a "media icon" or "icon" as a representation of a media object on a terminal device, usually a computer screen.

The present invention is directed to a graphical representation of media object delivery in a limited bandwidth wherein the delivery of these objects may be optimized to make the best use of the available bandwidth. In a preferred embodiment, the invention presents three screens, or "views" to the system designer.

The designer advantageously first orchestrates a multimedia presentation by deploying media objects as a script on a "playback" score. The playback score allows the system designer to select and schedule media objects to be played back in overlapping sequence so as to make a predefined presentation. The playback score shows the media objects represented as playback icons relatively deployed on a time-indexed schedule, much like a musical score shows notes represented as recognizable marks on a stave. Many of the playback parameters of the scripted media objects, such as time to start and time to stop, may be inferred from the system designer's placement of the playback icons on the playback score. The designer may also input additional parameters regarding the scripted media objects themselves. These additional parameters include media object size (when file size is not already known by the computer system), sequencing requirements with other objects, synchronicity requirements with other objects, and so on.

A second screen, or "view" corresponding to the playback score is the runtime view. Advantageously viewable concurrently with the playback score by arranging multiple windows oh the screen, the runtime view allows the system designer to see the executed presentation of the playback score in real time. In the runtime view, the system defaults to playing back the playback score at "real time" speed from a start point to an end point in time as marked by the designer on the playback score. The designer may also speed up or slow down the runtime view's execution as required to observe particular details. It will be understood, however, that the runtime view is a "slave screen" as far as orchestration of the playback score itself is concerned. That is, the designer uses the playback score as the tool to ordain the selection and substantive scheduling of media objects in making a presentation. The runtime view merely allows the designer to see the results of his or her work as it will be presented in the final product.

As the playback score and the corresponding runtime view are being developed, the present invention also develops a download score. This screen, or "view," is a third view corresponding to the playback score, again also viewable by switching computer screens or manipulating multiple windows. The download score is a tool for the system designer to adapt the script embodied by the playback score (the "playback script") into a corresponding delivery schedule within predefined constraints of bandwidth (the "download script"). The system designer may thus create a playback script with a view to enabling the script to be played back intelligibly over a connection of limited bandwidth. The download score deploys download icons on the display, each download icon corresponding to a playback icon on the playback score. Each download icon is initially deployed as a rectangular shape whose area is scaled on the screen according to the data size of the media object represented thereby. The location and initial shapes follow default rules.

The system designer can then ordain a selected bandwidth constraint on the download score, advantageously by setting parallel lines (or a "pipe") of download speed. The combined rectangular shapes of download icons, as adapted, are now compressed to "fill up" the pipe. As a result, certain download icons as displayed are likely to overlap within the pipe. Advantageously using well-known "drag and drop" techniques, the designer can now adapt the rectangular shape of the download icons within the pipe while the system keeps the area constant. The initially rectangular shapes can be manually reshaped or moved, as desired by the designer, into subsequent rectangular or square-cornered polygonal shapes while the system keeps the topographical area constant. Against a scaled grid of download speed versus elapsed time, a download icon's adapted shape can be viewed to represent the delivery of a media object at a particular download speed (or series of download speeds) over corresponding download time periods.

A "full" pipe for any period of time indicates that all available bandwidth is now used up for that period. Additional space can be made within the pipe in a number of ways, such as delaying delivery of some media objects, or "pre-loading" others (delivering them before they are needed), or slowing down the download speed of selected objects so that they take longer to be delivered. Sometimes it will not be physically possible to make space in the pipe, however, either because there is no room in earlier bandwidth to pre-load, or because delay or slowdown in download of one or more media objects causes delivery of data in those media objects no longer to be able to keep up with demand in the playback script. The system alerts the designer of such conditions with visible or audible alarms indicating the problem icons. The designer must then make modifications to the selection, content and/or scheduling of playback icons on the playback score (or relax the bandwidth constraint on the download score). After such modifications, the designer can return to moving and reshaping download icons, and this time, if appropriate modifications have been made to free up sufficient bandwidth, the designer should be able to adapt all download icons to fit within the pipe without causing an error condition.

As noted in a preferred embodiment, the present invention is embodied by software executable on a general purpose desktop computer. The computer is advantageously a multimedia-grade computer with capability to display alternately or concurrently the playback score, the runtime view and the download score, and further to play both visual and aural media objects in the runtime view according to the playback script. The software ideally runs under a well-known user-friendly operating system environment such as Microsoft® Windows.

A primary application for the invention is thus the design of UDTs, so that bandwidth constraints may be taken into account when scripting media objects to be delivered to a user to enable an information transaction. The present invention is nonetheless not limited to this UDT application, and may be used whenever media object delivery needs to be optimized within varying bandwidth availability.

In general, the specific "program" that is delivered to the end user can be tailored to fit the available bandwidth to the end user. Several different programs may be developed, all with the same general content, but with different bandwidth constraints.

It is therefore a technical advantage of the present invention to optimize available bandwidth in delivering media objects.

It is a further technical advantage of the present invention to facilitate creation of an array of media object download scripts, each generally directed to delivering information in formats and/or media compatible with a particular receiving terminal device, each further specifically delivering selected media objects on a schedule deliverable within incremental ranges of available bandwidth.

It is a further object of the present invention to provide a designer with an interactive graphical tool with a playback score to design and adjust media object playback scripts within various bandwidth limitations. By also providing a companion download score on which the designer may adapt download icons to fit within a fixed pipe of bandwidth, the tool enables the designer to schedule the delivery of the media objects to meet the demand for data in the playback script.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
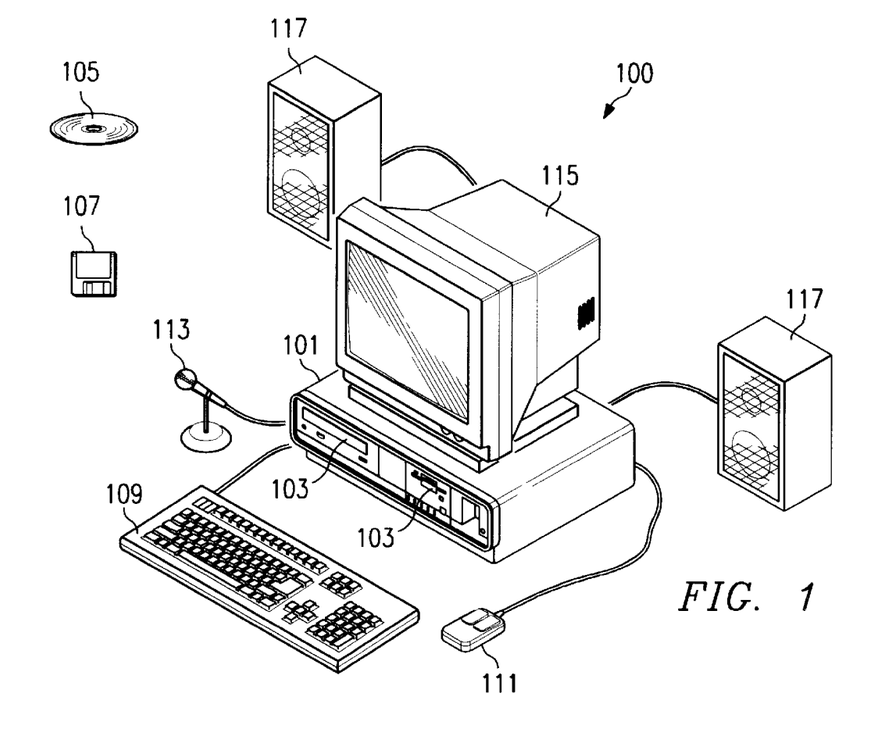
FIG. 1 illustrates an exemplary computer system 100 on which a preferred embodiment of the present invention may advantageously be run.

A preferred embodiment of the present invention is enabled on a general purpose desktop computer, advantageously "multimedia" grade, as illustrated on FIG. 1. Referring to FIG. 1, system 100 comprises CPU 101, having an internal processor, memory, and a mass storage device such as a hard drive (these internal components not illustrated). CPU 101 also advantageously includes drives 103 to read and write to external mass storage devices such as CD 105 or diskette 107. User input is enabled via standard peripheral devices such as keyboard 109, mouse 111 and microphone 113. System output is enabled visually on monitor 115, and audibly on speakers 117.

In a preferred embodiment, the present invention is a software tool executable on system 100, although it will be understood that the principles and scope of the present invention are not limited to any particular specific hardware architecture or configuration. The present invention may be stored on any suitable mass storage device as a computer program product comprising instructions and logic readable and executable by system 100. Such suitable mass storage devices include CD 105, diskette 107, or hard drive within CPU 101 (not illustrated). Likewise, data to be processed by the present invention, including media objects and selected instructions from the user, may be stored on system 100 as computer-readable files on mass storage devices such as CD 105, diskette 107, or hard drive within CPU 101 (not illustrated).

Figure 2A:
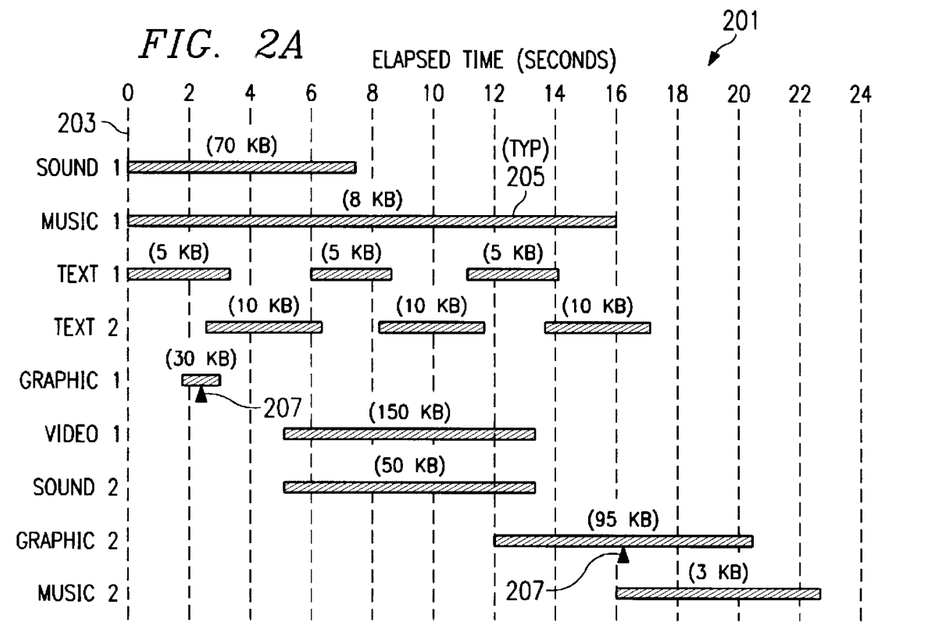
FIG. 2A illustrates an exemplary playback score 201 as used according to the present invention to orchestrate the playback of media objects.
Figure 2B:
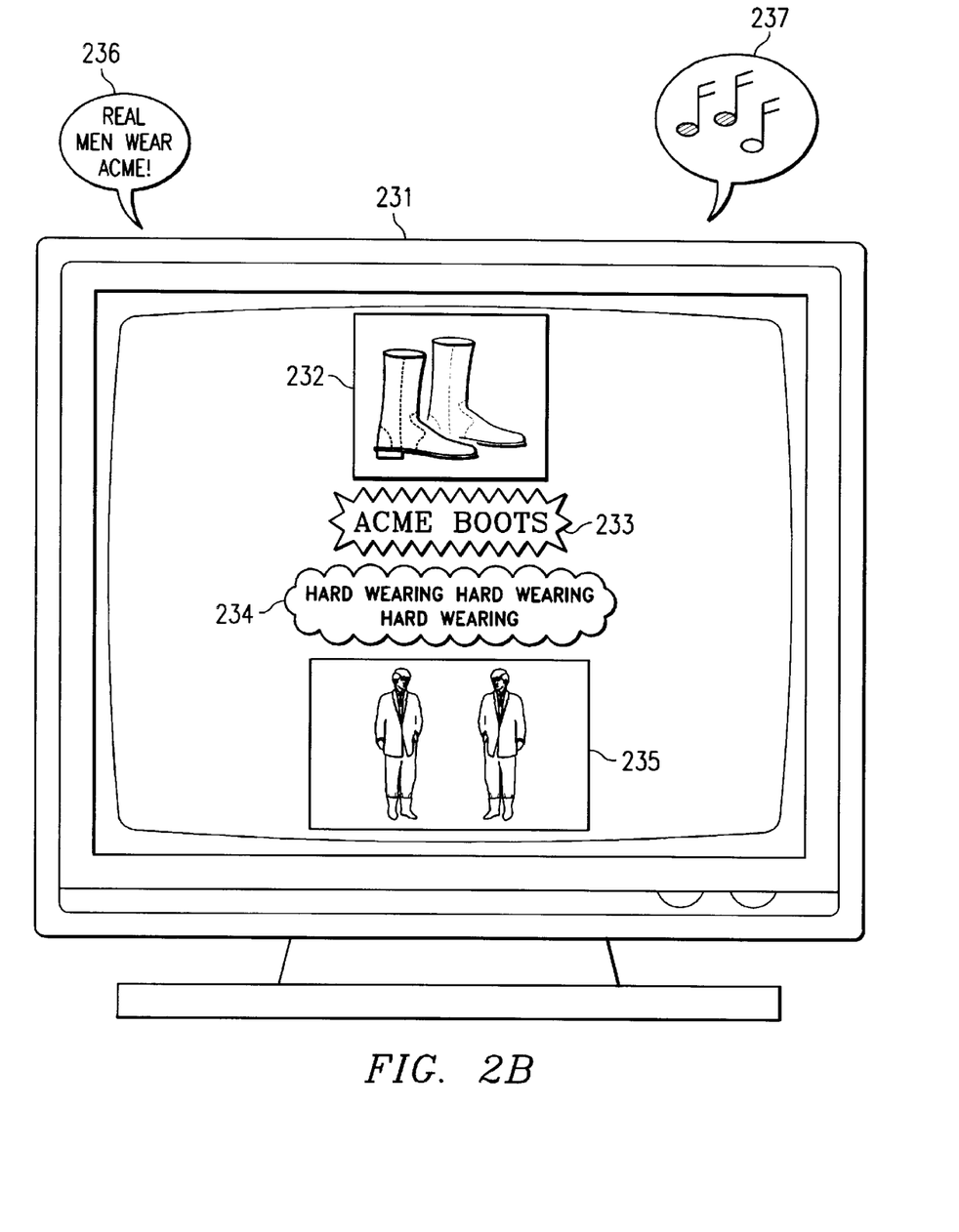
FIG. 2B illustrates runtime view 231 corresponding to the exemplary playback score illustrated in FIG. 2A.
Figure 2C:
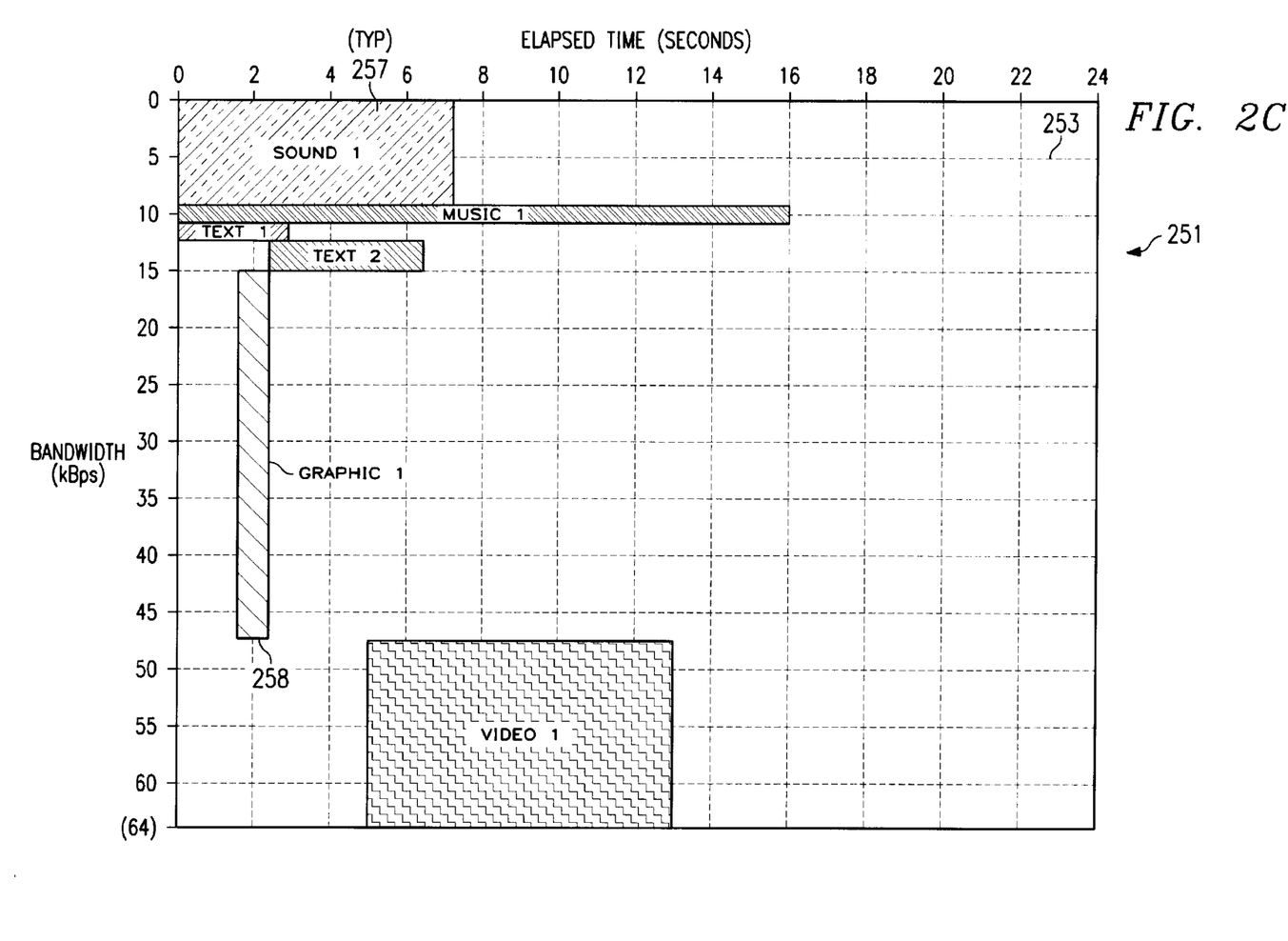
FIG. 2C illustrates download score 251 corresponding to the exemplary playback score illustrated in FIG. 2A, prior to adaptation of download icons 257 by the system designer.

With reference now to FIGS. 2A, 2B and 2C, and with continuing reference to the components illustrated on FIG. 1, the main elements comprising the tool of the present invention are shown. FIG. 2A illustrates playback score 201 in a style similar to graphical media object orchestration and playback displays known in the art. Scaled playback grid 203 shows time indexed on the x-axis and a plurality of playback icons 205 disposed down the y-axis. Each playback icon 205 represents a corresponding media object to be played within a time window indicated by the left and right extremities of the icon 205 as located on the x-axis of playback grid 203. The system designer may add, drop and move playback icons 205 around playback grid 203, effecting temporal changes in the "orchestral" playback sequence of the combined corresponding playback. Other aesthetic effects are also advantageously available, such as, for example, speed of playback of individual media objects, volume of playback of audible objects etc. As a result, a multimedia presentation may be orchestrated, including voice, text, graphics, photographs and music, according to a script represented by playback icons 205 deployed on playback grid 203.

FIG. 2B illustrates a runtime view 231 corresponding to playback score 201 on FIG. 2A. The system designer switches to runtime view 231 to see and hear the multimedia presentation orchestrated on playback score 201. In the examples used in FIGS. 2A and 2B, playback icons 205 on FIG. 2A correspond to audiovisuals on FIG. 2B as follows on Table 1:

TABLE 1

| Playback Icon on FIG. 2A | Audiovisual item on FIG. 2B |
| --- | --- |
| Graphic 2 | 232 |
| Graphic 1 | 233 |
| Text 1/Text 2 | 234 |
| Video 1 | 235 |
| Sound 1 | 236 |
| Music 1 | 237 |

Advantageously, the system designer can switch to runtime view 231 at any time to view all or part of the multimedia presentation orchestrated on playback score 201, responsive to start and stop markers set on playback score 201. The system designer may further advantageously vary the replay speed of runtime view 231 in order to give attention to specific aspects. It will be understood, however, that runtime view 231 is a "slave" replay to playback score 201, and any substantive changes to the content of the orchestrated playback script must be made on playback score 201. To this extent, runtime view 231 merely allows the designer to see the results of his or her work.

Turning now to FIG. 2C, the present invention provides a third "view" of the multimedia presentation being orchestrated on playback score 201 on FIG. 2A. In a preferred embodiment, playback score 201, runtime view 231 and download score 251 are further viewable by the system designer substantially concurrently. Any method known in the art to enable this is satisfactory, such as, for example, splitting a screen into tiles or "switching" between screens, or viewing separate windows.

FIG. 2C illustrates a download score 251 as created by the present invention. Download score 251 corresponds with playback score 201 such that changes to playback score 201 are automatically reflected in download score 251. Also analogous to playback score 201, download score 251 provides download grid 253 indexed on the x-axis to represent time. It is preferable, but not required, for the temporal scale on the x-axes of both playback and download grids 201 and 251 to be substantially the same in a default setting. Advantageously, however, the system designer may vary the x-axis scales of playback and download grids 201 and 251 independently.

In distinction to playback grid 203 as shown on FIG. 2A, however, download grid 253 on FIG. 2C also has a scaled y-axis. This y-axis represents bandwidth, and is advantageously indexed in increments of kilobits per second (kbps). Optimally, the system designer may vary the x-axis and y-axis scales as displayed on download grid 253 independently.

FIG. 2C shows download icons 257 deployed by the system on download grid 253. The system creates a download icon 257 for each playback icon 205 placed on playback score 201 by the system designer (as illustrated in FIG. 2A) in orchestrating a multimedia presentation. The systems first identifies and fixes the topographical area of each download icon 257 in view of the x- and y-scales selected for download grid 253. The system accomplishes this by analyzing each media object's data size, and then determining and assigning the topographical area corresponding to that data size on the currently selected x- and y-scales of grid 253.

The system then deploys download icons 257 on download grid 253 according to default rules. In a preferred embodiment, download icons 257 are deployed as rectangles having the pre-assigned topographical area. The x-dimension of each rectangle defaults to start and end at equivalent points in time to the system designer's deployment of the corresponding playback icon 205 on the playback score as shown on FIG. 2A. The y-dimension of each rectangle defaults to a length required to enclose the pre-assigned topographical area for the download icon in view of the default x-dimension. It will be appreciated that this y-dimension in the initial deployment will also represent the minimum delivery rate required to prevent the corresponding media object from "starving" during playback absent any pre-loading of data.

Further, as shown on FIG. 2C, the system deploys download icons in an initial default setting to extend vertically down the y-axis without overlap. With particular reference to FIG. 2C, it will be appreciated that not all download icons 257 are always viewable at once when initially deployed in this way without overlap. Scrolling functionality in download score 251, however, advantageously permits the system designer to see all download icons 257 in this initial default deployment.

It will be appreciated that the foregoing initial default deployment rules for download icons 257 as described above are exemplary only, and others default settings are possible within the scope of the present invention.

Download icons 257 as deployed on grid 253 according to FIG. 2C now represent a Download Script in an environment of infinite bandwidth, i.e. an unconstrained schedule for delivery of media objects corresponding to the Playback Script embodied by playback score 201 on FIG. 2A. Looking at FIG. 2C, download icons 257 show when to start delivering individual media objects and at what speed, through to exhaustion of data to be delivered. Since delivery (by exemplary default rule) is initially synchronous with demand on the playback score 201 on FIG. 2A and because (by default rule) the corresponding delivery speed is at least that required to prevent playback from "starving," delivery for data on the initially-deployed Download Script will by default rule always keep up with the demand for data in the Playback Script.

Figure 2D:
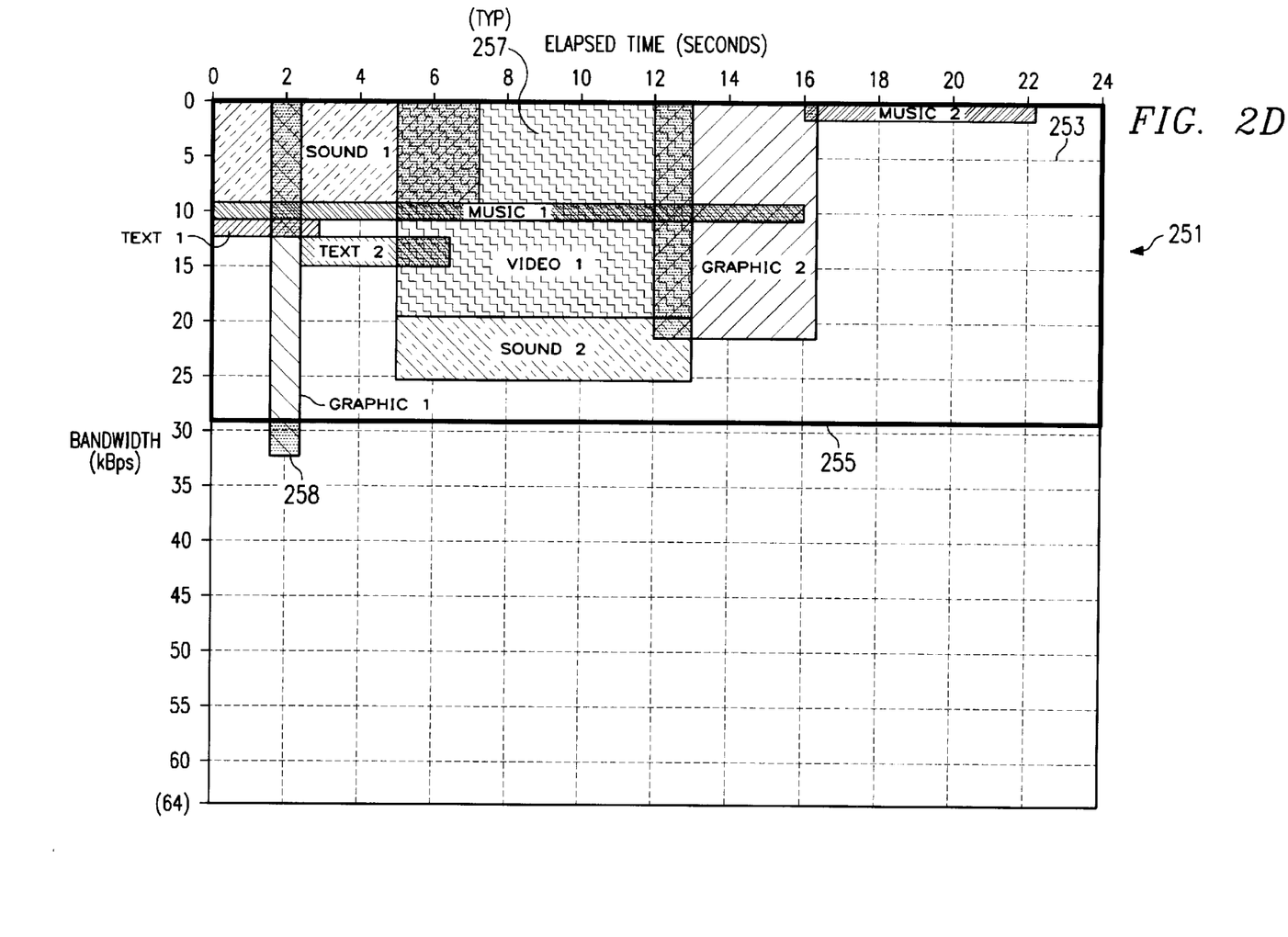
FIG. 2D illustrates download score 251 as depicted on FIG. 2C after the system designer constrains bandwidth by introducing pipe 255.

Turning now to FIG. 2D, the system designer now places a constraint of bandwidth on download score 251. This constraint is shown as pipe 255, where parallel lines perpendicular to the x-axis represent the bandwidth available in a connection through which the designer wishes to deliver the media objects scripted in corresponding playback score 201 (as illustrated on FIG. 2A). It will be seen that the deployment of pipe 255 on FIG. 2D now causes download icons 257, which previously extended vertically in a default arrangement, to compress into pipe 255 and substantially overlap. It will be further seen on FIG. 2D that certain download icons 257 as initially deployed on FIG. 2C may have x-dimensions greater than the width of pipe 255. These download icons are left, after compression into pipe 255 as on FIG. 2D, with portions of their topological areas overhanging the confines of pipe 255.

Further reference to FIG. 2D also shows that areas of download icons 257 overlapping within pipe 255, or overhanging outside pipe 255, are highlighted, advantageously with shading or alternative colors. An audible alarm may be provided whenever overlap or overhang conditions occur, although preferably the system designer has the option of disabling the audible alarm if he or she so desires.

Figure 2E:
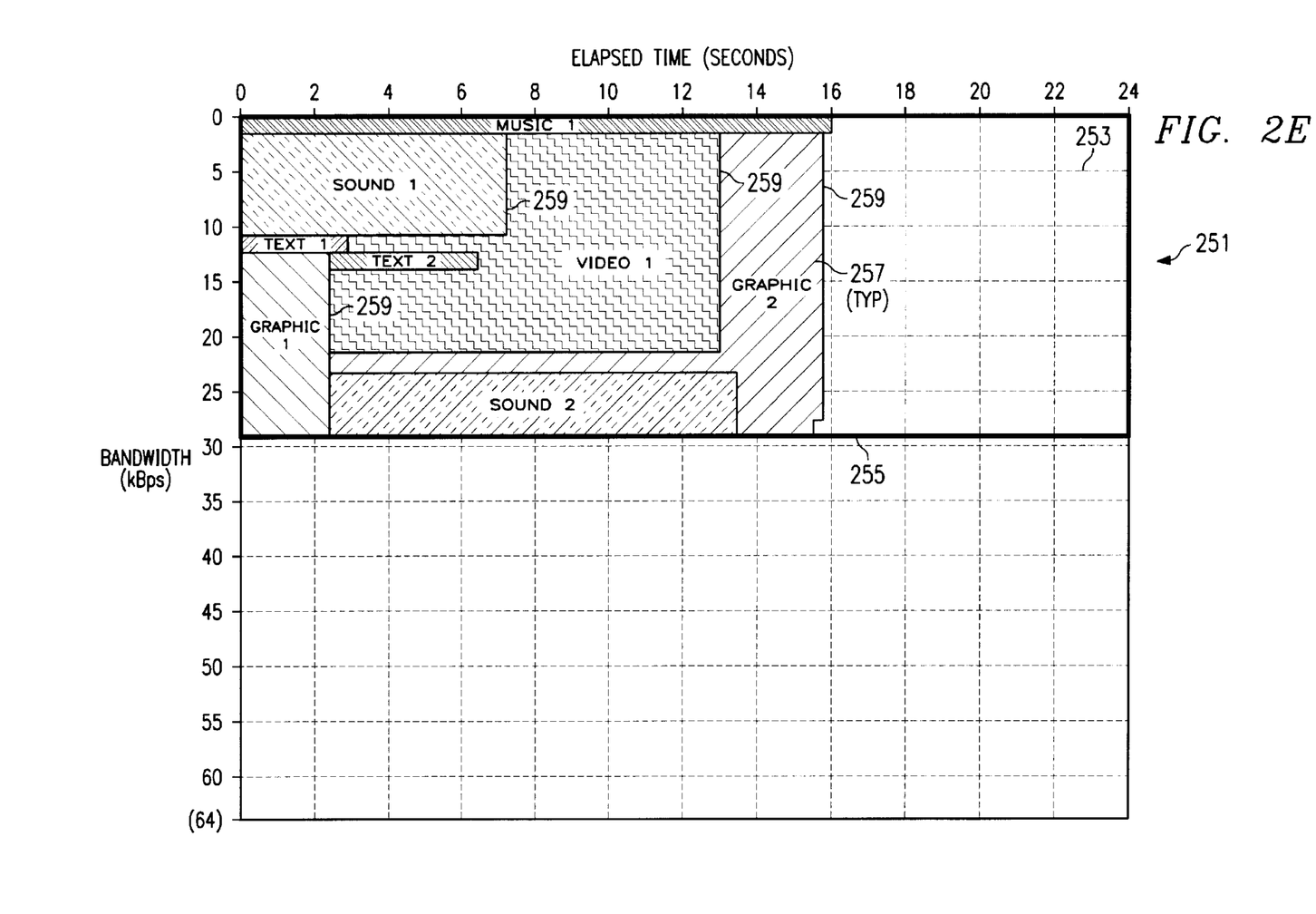
FIG. 2E illustrates the download score 251 of FIG. 2D after the system designer has adapted download icons 257 to fit pipe 255.

With reference now to FIG. 2E, the system designer manipulates the shape and position of download icons 257, advantageously using well-known "drag-and drop" mouse operation techniques, so that all icons 257 fit within pipe 255 without any overlap or overhang. The designer may move an entire download icon 257 around on grid 253. Alternatively, the designer may anchor an icon 257 and then rearrange its boundaries (by moving all or portions of its outer lines) to change the shape of the icon into any polygon having square corners. As the designer adapts the shape of an icon 257, however, the system always maintains the total topographical area of the icon constant, as calculated earlier to correspond to the data size of the media object represented thereby. In maintaining a constant topological area, the system advantageously always compensates for the designer's adaptations by extending or retracting the "end-of-delivery boundary" of the download icon 257. As shown on FIG. 2E as boundary 259, the end-of-delivery boundary is the boundary of a download icon 257 running perpendicular to the x-axis on grid 253 that defines a time on the x-axis when delivery of the media object represented by that icon is complete.

As noted, and as shown on FIG. 2E, the system designer moves download icons 257 around within pipe 255 and adapts their shape with a view to fitting all icons in pipe 255. This is accomplished by moving icons 257 and adapting their shape so that all overlapping or overhanging portions of icons 257 occupy free space on download grid 253 within pipe 255. This operation represents using up excess bandwidth during the delivery of media objects in a Download Script.

Figure 2F:
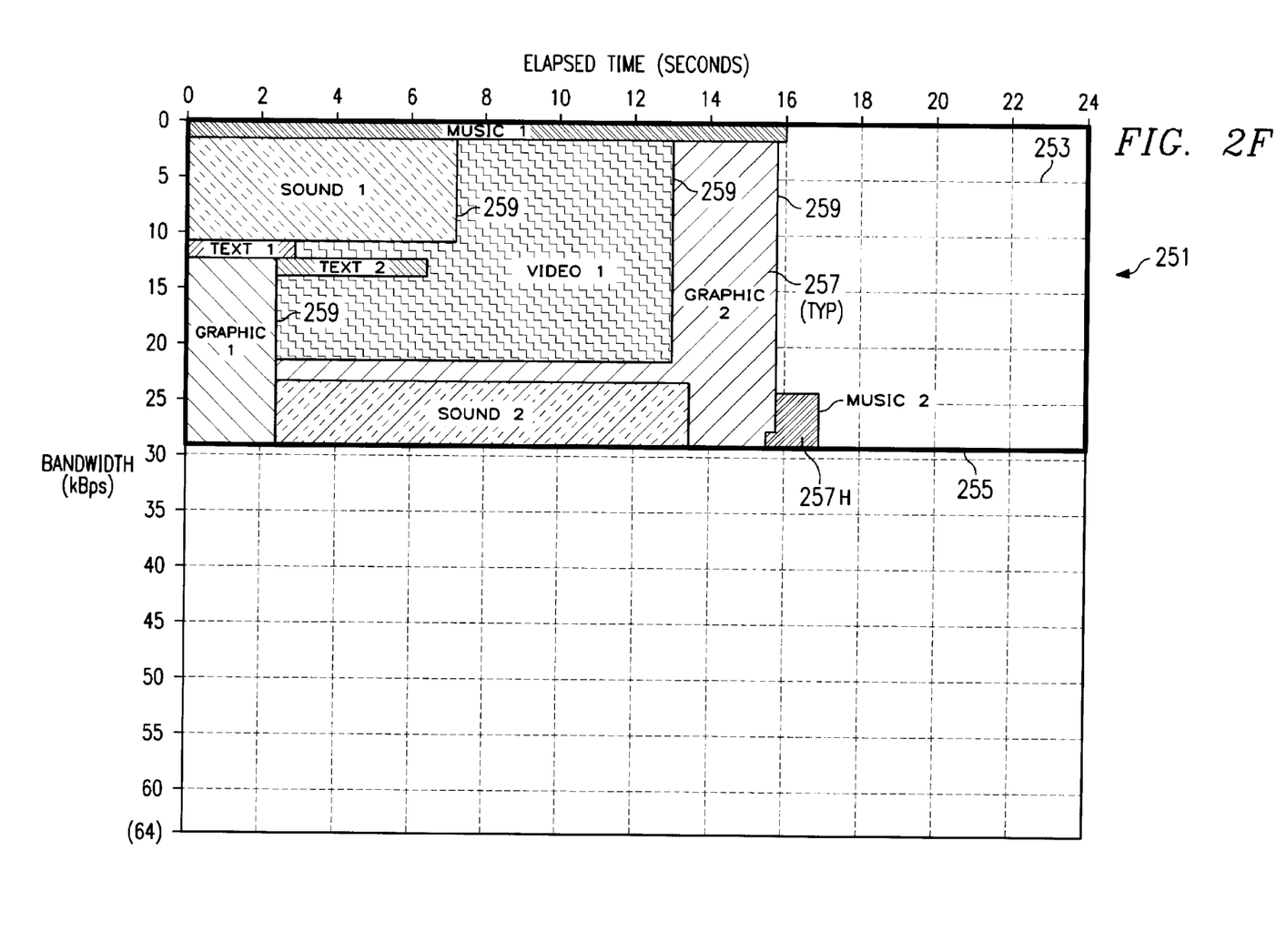
FIG. 2F illustrates an exemplary download score 251 in which download icon 257H is highlighted to indicate that delivery thereof as currently ordained on download score 251 cannot keep up with demand on the corresponding playback score 201.

With reference now to FIG. 2F, a further important system condition applies as the designer moves download icons 257 around and adapts their shape to fit within pipe 255. It is critical that in developing a Download Script on download score 251, the designer does not delay the delivery of data in media objects so as to "starve" playback score 201 (on FIG. 2A) of data in the system's execution of the Playback Script. In other words, delivery on the Download Script must always keep up with demand on the Playback Script. It will be seen, however, that in moving and adapting download icons 257 to fit within pipe 255 on download score 251, a system designer might accidentally deploy a download icon 257 so that data in the corresponding media object is scheduled to be delivered after it is required on the Playback Schedule. This condition is referred to herein as a "starving" error condition.

As shown on FIG. 2F, the system alerts this starving error condition to the designer by visibly highlighting the download icon in error 257H by shading, alternate color, or an equivalent method. The system may also issue an audible alarm, which the designer may disable if he or she so desires. Advantageously, the highlighting (and the audible alarm) are distinct from the highlights (and alarms) issued by the system to alert for overlaps or overhangs, as described above with reference to FIG. 2D. Responsive to being alerted of a starving error condition, the designer must make further movements and shape adaptations of download icons 257 to get all icons 257 to fit within pipe 255, without overlap, overhang or "starving."

The deployment of static download icons 257 (such as graphic icon 258 on FIG. 2C) on download score 251 deserves special mention. It will be understood that in typical multimedia presentations, "dynamic media objects" (such as audio or video) have a dynamic real time play length, whereas "static media objects" (such as graphics) are displayed statistically for a preselected time. It will, therefore, be appreciated that static media objects such as graphics are advantageously deployed in a multimedia presentation as quickly as possible, so that the image appears rapidly.

In a preferred embodiment, as shown on FIG. 2C, an initial default deployment rule is followed wherein static download icons are initially deployed to fully download during the first 50% of their corresponding display presence time on runtime view 231 on FIG. 2B. This is reflected in the start and stop times in the deployment of graphic icon 258 on download grid 253 on FIG. 2C. Note that 50% is an exemplary value, and ideally is a designer-selectable parameter for different types of static media objects. In subsequently moving and adapting graphic icon 258 in the download score following initial deployment according to the 50% rule, however, the designer will ideally select final placement within pipe 255 so as to deliver the information rapidly. The corresponding image will then appear quickly in runtime view 231 on FIG. 2B.

It will be further appreciated that static media objects such as pictures can also be partially presented early in the Playback Script as an incomplete or blurry image that nonetheless enhances the viewer's experience by bringing early indications of the picture into the script. Once deployed in a "partial" state, the picture can then receive more data to clean it up as the script continues.

With reference now to FIG. 2A, it will be seen that static playback icons 205 each have a marker 207 along the time-based x-axis. Markers 207 indicate a "minimum clarity point" in the delivery of corresponding download icons 257 on download score 251 (see FIG. 2C). Markers 207 are automatically generated by the system. The "minimum clarity point" is a designer-selectable percentage of data in the media object which, when displayed on runtime view 231 on FIG. 2B, will make the media object appear acceptably intelligible to the viewer. The "minimum clarity point" may of course selected to be as much as 100%, if the system designer determines that a "partial" display of the corresponding media object, such as a blurry image, is undesirable. Markers 207 on playback icons 205 on FIG. 2A indicate, during the playback period of static icons, when the "minimum clarity point" will be reached according to the current Download Script. If the designer sees on playback score 201 that a marker 207 is unacceptably late in the display of a particular static icon, he or she may wish to adapt the corresponding download icon 257 on download score 251 to deliver data sooner, causing marker 207 to be displayed earlier in time on playback score 201.

It will be appreciated that sometimes, a situation will occur when a system designer is unable to fit all download icons 257 inside pipe 255 on the download score without creating an overlap, overhang or starving error. In such a case there is simply insufficient bandwidth for the Download Script to be compatible with the Playback Script. The system designer must then either relax the bandwidth constraint by making pipe 255 wider, or take one or more corrective actions on playback score 201. Such corrective actions may include a combination of the following:

(a) altering the Playback Script to reduce demand for data at critical periods (e.g. play data-rich media objects slower and/or later);

(b) changing the content characteristics of one or more media objects, such as substituting in a less data-rich media object (e.g. text for a graphic, midi music for "wav" music), or degrading the data-richness of the media object (e.g., reducing the sampling rate in a "wav" sound file); or (f) delaying the start of all or parts of the script by a small time period to allow more time for media objects to "pre-load".

Depending on the corrective actions taken by the system designer on playback score 201, the system makes corresponding adjustments to download icons 257 as currently deployed on the download score. Deleting a playback icon 205 from playback score 201 causes the system to remove the corresponding download icon 257 from download score 251. Adding a playback icon 205 causes the system to deploy a new corresponding download icon 257 on download score 251 as a rectangle, as described above with reference to FIG. 2C. Moving the start time of a playback icon 205 on playback score 201 causes the system to move the entire corresponding download icon 257 an equivalent time period on download score 251. Moving the end time of a playback icon 205 on playback score 251 causes the system to extend or bring forward the end-of-delivery boundary so that delivery is complete at the same new time on download score 251. Altering the content of a media object causes the system to first recalculate and re-assign the topographical area now representing the new data size of the media object. The system then adjusts the topographical area of the corresponding download icon 257 on download score 251 by cutting or adding area at the end-of-delivery boundary.

Having taken corrective action on playback score 201, the system designer returns to download script 251 to make further adaptations of download icons 257. There will likely be overlaps and overhangs on download script 251 as a result of the system's response, as described above, to the designer's corrective actions on playback score 201. If the designer took sufficient corrective action on playback score 201 to enable the Download Script to keep up with the Playback script, the designer should now be able to fit all download icons 257 within pipe 255. Otherwise, further corrective action will be required on playback score 201 until all download icons 257 fit within pipe 255 on download score 251.

The application of the present invention to the design of User Design Templates ("UDTs"), as disclosed in the Previous Invention, will now be appreciated. Separate UDTs may be designed where playback script 201 enables the information exchange of the corresponding Transaction Template ("TT") according to different delivery bandwidth ranges. For example, where delivery bandwidth is measured in the range, say, above 28,800 bps modem speed, a UDT may be associated with the TT having a playback script whose information richness requires delivery bandwidth of 28,800 bps or less. Where the delivery bandwidth is measured below 28,800 bps, but above, say 14,400 bps, a second UDT may be associated with the TT where the information richness of the playback requires delivery bandwidth of at least 14,400 bps. It will be understood that, at the discretion of the system designer, there may also come a point in the bandwidth spectrum where the measured bandwidth is so low that the media objects are not worth delivering.

The foregoing selection of 24 kbps and 8 kbps as "cutoff" bandwidths are exemplary only. Ideally, an advantageous "cutoff" might occur when bandwidth becomes sufficiently low for a media object in a playback script to be required to be dropped rather than rescheduled or substituted. Other conditions, however, may also serve as thresholds to form "cutoff" bandwidths where a different UDT might be associated with a TT.

It will be understood that once the system designer is satisfied with a particular combination of Playback and corresponding Download Scripts, the present invention then memorializes the Download Script as, for example, a job execution file. This execution file may be used subsequently to control the delivery of media objects according to the Download Script.

Although the present invention and its advantages have been described in detail, it should be understood that various changes, substitutions and alterations can be made herein without departing from the spirit and scope of the invention as defined by the appended claims.

I claim:

1. A method for allocating bandwidth in a multimedia scripting tool, the method comprising the steps of:

(a) writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;

(b) responsive to step (a), robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;

(c) introducing a constraint of bandwidth in which the download script must deliver media objects to feed playback thereof in the playback script; and (d) manually rearranging and adapting the shapes of the download icons on the download score so that the delivery script delivers media objects within the constraint of bandwidth to keep up with demand therefor in the playback script.

2. The method of claim 1, in which the download score presents a first axis scaled in increments of elapsed time orthogonal to a second axis scaled in increments of bandwidth, and in which download icons are deployed on the download score in step (b) as shapes whose topographical areas, in view of said scales of the first and second axes, are automatically sized to represent the data size of the corresponding media objects.

3. The method of claim 2, in which download icons are deployed in step (b) according to initial default settings, the default settings including deploying the download icons as predetermined shapes.

4. The method of claim 3, in which the predetermined shapes are rectangles.

5. The method of claim 4, in which the default settings further include, for download icons representing dynamic media objects, deploying the rectangles in a length along the first axis synchronous with the preselected period of time in which the corresponding playback icon is deployed on the playback score in step (a).

6. The method of claim 4, in which the default settings further include, for download icons representing static media objects, deploying the rectangles in a default length along the first axis, the default length commencing at a start time synchronous with the commencement of the preselected period of time in which the corresponding playback icon is deployed on the playback score in step (a), the default length extant from the start time for a period that is a predetermined percentage, up to 100%, of the preselected period of time in which the corresponding playback icon is deployed on the playback score in step (a).

7. The method of claim 6, in which the predetermined percentage is 50%.

8. The method of claim 6, in which playback icons representing static media objects also each indicate a minimum clarity point on the playback score at which a predetermined percentage, up to 100%, of the corresponding media object has been delivered according the current delivery script.

9. The method of claim 3, in which the default settings further include deploying the download icons one at a time down the second axis.

10. The method of claim 2, in which the constraint of bandwidth is a pipe formed by a space bounded between the first axis and a line drawn parallel thereto, the line further orthogonal to a point on the second axis representing the constraint of bandwidth.

11. The method of claim 10, in which the download icons are manually adapted into interleaving but non-overlapping square-cornered polygons situated within the pipe, the topographical areas enclosed by said square-cornered polygons automatically held constant throughout said adaptation.

12. The method of claim 11, in which the topographical areas enclosed by said square-cornered polygons, as deployed on the download score, present an end-of-delivery boundary orthogonal to the first axis, and in which the topographical areas enclosed by said square-cornered polygons are automatically held constant throughout said adaptation by extending or retracting the corresponding end-of-delivery boundaries.

13. The method of claim 11, in which said adaptation is accomplished using "drag and drop" techniques.

14. The method of claim 11, further comprising the step of:
   (e) alerting of an error condition.

15. The method of claim 14, in which step (e) is accomplished audibly.

16. The method of claim 15, in which said audible alert may be selectively disabled.

17. The method of claim 14, in which the error condition is that at least one download icon, as deployed on the download score, is calling for the delivery of data in the corresponding media object in the delivery script later than when said data is needed in the playback script.

18. The method of claim 17, in which step (e) is accomplished by visibly highlighting said at least one download icon.

19. The method of claim 18, in which step (e) is further accomplished by highlighting the playback icons corresponding to said at least one download icon.

20. The method of claim 1, further comprising the step of:
   (e) playing back the media objects according to the playback script.

21. The method of claim 20, in which step (e) is executed in a separate runtime view.

22. The method of claim 21, in which the runtime view, the playback score and the delivery score are separately and independently viewable.

23. The method of claim 1, in which the playback score and the delivery score are separately and independently viewable.

24. The method of claim 23, further comprising the step of:
   (f) manually correcting for said error condition.

25. The method of claim 24, in which said error correction is accomplished by a combination of techniques, at least one of said techniques selected from the group consisting of:
   (1) altering the playback script to play first selected media objects slower;
   (2) altering the playback script to play second selected media objects later; and
   (3) altering the data size of third selected media objects.

26. The method of claim 25, in which altering the data size of the third selected media objects causes corresponding end-of-delivery boundary adjustment on the delivery score.

27. A method for allocating bandwidth in a multimedia scripting tool, the method comprising the steps of:
   (a) writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;
   (b) responsive to step (a), robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script, the download score presenting a first axis scaled in increments of elapsed time orthogonal to a second axis scaled in increments of bandwidth, download icons being deployed on the download score as shapes whose topographical areas, in view of said scales of the first and second axes, are automatically sized to represent the data size of the corresponding media objects;
   (c) initially deploying download icons in step (b) representing dynamic media objects as rectangles having a first default length along the first axis synchronous with the preselected period of time in which the corresponding playback icon is deployed on the playback score in step (a);
   (d) initially deploying download icons in step (b) representing static media objects as rectangles having a second default length along the first axis, the second default length commencing at a start time synchronous with the commencement of the preselected period of time in which the corresponding playback icon is deployed on the playback score in step (a), the second default length extant from the start time for a period that is a predetermined percentage, up to 100%, of the preselected period of time in which the corresponding playback icon is deployed on the playback score in step (a), playback icons representing static media objects also each indicating a minimum clarity point on the playback score at which a predetermined percentage, up to 100%, of the corresponding media object has been delivered according the current delivery script;
   (e) introducing a constraint of bandwidth in which the download script must deliver media objects to feed playback thereof in the playback script, the constraint of bandwidth represented as a pipe formed by a space bounded between the first axis and a line drawn parallel thereto, the line further orthogonal to a point on the second axis representing the constraint of bandwidth;
   (f) manually arranging the download icons on the download score so that the delivery script delivers media objects within the constraint of bandwidth to keep up with demand therefor in the playback script, said arranging accomplished by adapting the download icons into interleaving but non-overlapping square-cornered polygons situated within the pipe, the topographical areas enclosed by said square-cornered polygons automatically held constant throughout said adaptation by extending or retracting the corresponding end-of-delivery boundaries;
   (g) playing back the media objects according to the playback script in a separate runtime view, wherein the runtime view, the playback score and the delivery score are separately and independently viewable;
   (h) alerting of an error condition in which at least one download icon, as deployed on the download score, is calling for the delivery of data in the corresponding media object in the delivery script later than when said data is needed in the playback script, said alerting step accomplished by visibly highlighting said at least one download icon and the playback icons corresponding thereto;
   (i) manually correcting for said error condition via a combination of techniques, at least one of said techniques selected from the group consisting of:
      (1) altering the playback script to play first selected media objects slower;
      (2) altering the playback script to play second selected media objects later; and
      (3) altering the data size of third selected media objects, wherein altering the data size of the third selected media objects causes corresponding end-of-delivery boundary adjustment on the delivery score.

28. The method of claim 27, in which, in step (d), the default length is extant from the start time for a period that is 50% of the preselected period of time in which the corresponding playback icon is deployed on the playback score in step (a).

29. The method of claim 27, in which said alerting step is also accomplished audibly.

30. The method of claim 29, in which said audible alert may be selectively disabled.

31. A system for allocating bandwidth in a multimedia scripting tool, the system comprising:

means for writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;

means, responsive to the means for writing, for robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;

means for introducing a constraint of bandwidth in which the download script must deliver media objects to feed playback thereof in the playback script; and means for manually adapting the download icons on the download score so that the delivery script delivers media objects within the constraint of bandwidth to keep up with demand therefor in the playback script, wherein the means for manually adapting is operable to adapt download icons into interleaving but non-overlapping square-cornered polygons situated within the constraint of bandwidth, the topographical areas enclosed by said square-cornered polygons automatically held constant throughout said adaptation by extending or retracting the corresponding end-of-delivery boundaries.

32. The system of claim 31, further comprising means for playing back the media objects according to the playback script in a separate runtime view, wherein the runtime view, the playback score and the delivery score are separately and independently viewable.

33. The system of claim 31, in which the download score presents a first axis scaled in increments of elapsed time orthogonal to a second axis scaled in increments of bandwidth, and in which means for robotically deploying is operable to deploy download icons on the download score as shapes whose topographical areas, in view of said scales of the first and second axes, are automatically sized to represent the data size of the corresponding media objects.

34. The system of claim 33, in which the means for robotically deploying is operable to deploy download icons according to initial default settings, the default settings including deploying the download icons as rectangles, the default settings further including deploying the rectangles one at a time down the second axis, the default settings further including, for download icons representing dynamic media objects, deploying the rectangles in a first default length along the first axis synchronous with the preselected period of time in which the means for writing deploys the corresponding playback icon on the playback score, the default settings further including, for download icons representing static media objects, deploying the rectangles in a second default length along the first axis, the second default length commencing at a start time synchronous with the commencement of the preselected period of time in which the means for writing deploys the corresponding playback icon on the playback score, the second default length extant from the start time for a period that is a predetermined percentage, up to 100%, of the preselected period of time in which the means for writing deploys the corresponding playback icon on the playback score.

35. The system of claim 34, in which the predetermined percentage is 50%.

36. The system of claim 34, in which playback icons representing static media objects also each indicate a minimum clarity point on the playback score at which a predetermined percentage, up to 100%, of the corresponding media object has been delivered according the current delivery script.

37. The system of claim 33, in which the constraint of bandwidth is a pipe formed by a space bounded between the first axis and a line drawn parallel thereto, the line further orthogonal to a point on the second axis representing the constraint of bandwidth.

38. The system of claim 37, in which the topographical areas enclosed by said square-cornered polygons, as deployed on the download score, present an end-of-delivery boundary orthogonal to the first axis, and in which the topographical areas enclosed by said square-cornered polygons are automatically held constant throughout said adaptation.

39. The system of claim 37, further comprising means for alerting of an error condition wherein at least one download icon, as deployed on the download score, is calling for the delivery of data in the corresponding media object in the delivery script later than when said data is needed in the playback script.

40. The system of claim 39, in which said means for alerting is audible and may be selectively disabled.

41. The system of claim 39, in which said means for alerting visibly highlights said at least one download icon.

42. The system of claim 41 in which the means for alerting also visibly highlights the playback icons corresponding to said at least one download icon.

43. The system of claim 39, further comprising means for manually correcting for said error condition via a combination of techniques, at least one of said techniques selected from the group consisting of:

(1) altering the playback script to play first selected media objects slower;

(2) altering the playback script to play second selected media objects later; and (3) altering the data size of third selected media objects, wherein altering the data size of the third selected media objects causes corresponding end-of-delivery boundary adjustment on the delivery score.

44. A computer program product including computer readable logic recorded thereon for allocating bandwidth in a multimedia scripting tool, the computer program product comprising:

a computer-readable storage medium; and a computer program stored on the computer-readable storage medium, the computer program comprising:

means for writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;

means, responsive to the means for writing, for robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;

means for introducing a constraint of bandwidth in which the download script must deliver media objects to feed playback thereof in the playback script;

means for manually adapting the download icons on the download score so that the delivery script delivers media objects within the constraint of bandwidth to keep up with demand therefor in the playback script;

means for alerting of an error condition wherein at least one download icon, as deployed on the download score, is calling for the delivery of data in the corresponding media object in the delivery script later than when said data is needed in the playback script; and means for manually correcting for said error condition via a combination of techniques, at least one of said techniques selected from the group consisting of:
(1) altering the playback script to play first selected media objects slower;
(2) altering the playback script to play second selected media objects later; and
(3) altering the data size of third selected media objects, wherein altering the data size of the third selected media objects causes corresponding end-of-delivery boundary adjustment on the delivery score.

45. The computer program product of claim 44, further comprising means for playing back the media objects according to the playback script in a separate runtime view, wherein the runtime view, the playback score and the delivery score are separately and independently viewable.

46. The computer program product of claim 44, in which the download score presents a first axis scaled in increments of elapsed time orthogonal to a second axis scaled in increments of bandwidth, and in which means for robotically deploying is operable to deploy download icons on the download score as shapes whose topographical areas, in view of said scales of the first and second axes, are automatically sized to represent the data size of the corresponding media objects.

47. The computer program product of claim 46, in which the means for robotically deploying is operable to deploy download icons according to initial default settings, the default settings including deploying the download icons as rectangles, the default settings further including deploying the rectangles one at a time down the second axis, the default settings further including, for download icons representing dynamic media objects, deploying the rectangles in a first default length along the first axis synchronous with the preselected period of time in which the means for writing deploys the corresponding playback icon on the playback score, the default settings further including, for download icons representing static media objects, deploying the rectangles in a second default length along the first axis, the second default length commencing at a start time synchronous with the commencement of the preselected period of time in which the means for writing deploys the corresponding playback icon on the playback score, the second default length extant from the start time for a period that is a predetermined percentage, up to 100%, of the preselected period of time in which the means for writing deploys the corresponding playback icon on the playback score.

48. The computer program product of claim 47, in which the predetermined percentage is 50%.

49. The computer program product of claim 47, in which playback icons representing static media objects also each indicate a minimum clarity point on the playback score at which a predetermined percentage, up to 100%, of the corresponding media object has been delivered according the current delivery script.

50. The computer program product of claim 46, in which the constraint of bandwidth is a pipe formed by a space bounded between the first axis and a line drawn parallel thereto, the line further orthogonal to a point on the second axis representing the constraint of bandwidth.

51. The computer program product of claim 50, in which the means for manually adapting is operable to adapt download icons into interleaving but non-overlapping square-cornered polygons situated within the pipe, the topographical areas enclosed by said square-cornered polygons automatically held constant throughout said adaptation by extending or retracting the corresponding end-of-delivery boundaries.

52. The computer program product of claim 44, in which said means for alerting is audible and may be selectively disabled.

53. The computer program product of claim 44, in which said means for alerting visibly highlights said at least one download icon and the playback icons corresponding thereto.

* * * * *